United States Patent
Byrne et al.

(10) Patent No.: US 8,973,630 B2
(45) Date of Patent: *Mar. 10, 2015

(54) TIRE INCLUDING CONCAVE RECESSES IN A CIRCUMFERENTIAL TREAD

(75) Inventors: Francis J. Byrne, Medina, OH (US); Keith Dumigan, Akron, OH (US)

(73) Assignee: Bridgestone Americas Tire Operations, LLC, Nashville, TN (US)

(*) Notice: Subject to any disclaimer, the term of this patent is extended or adjusted under 35 U.S.C. 154(b) by 641 days.

This patent is subject to a terminal disclaimer.

(21) Appl. No.: 12/877,466

(22) Filed: Sep. 8, 2010

(65) Prior Publication Data

US 2011/0220257 A1 Sep. 15, 2011

Related U.S. Application Data (63) Continuation of application No. 11/594,383, filed on Nov. 8, 2006, now Pat. No. 7,819,153.

(51) Int. Cl.
*B60C 11/12* (2006.01)
*B60C 11/13* (2006.01)
*B60C 11/03* (2006.01)

(52) U.S. Cl.
CPC ............. *B60C 11/13* (2013.01); *B60C 11/0302* (2013.01); *B60C 11/032* (2013.01); *Y10S 152/03* (2013.01); *Y10S 152/903* (2013.01); *B60C 2011/133* (2013.01)
USPC ........... 152/209.18; 152/209.21; 152/DIG. 3; 152/903

(58) Field of Classification Search
USPC ............. 152/209.16, 209.18, 209.21, DIG. 3, 152/903
See application file for complete search history.

(56) References Cited

U.S. PATENT DOCUMENTS

| | | |
|---|---|---|
| 2,268,344 A | 12/1941 | Shesterkin |
| 2,605,807 A | 8/1952 | Wittmer |
| 2,620,009 A | 12/1952 | Giebhart |
| 3,055,410 A | 9/1962 | Caulkins |
| 3,532,147 A | 10/1970 | Gough et al. |
| 3,951,193 A | 4/1976 | Yeager |
| 4,177,850 A | 12/1979 | Ogawa et al. |
| 4,542,778 A | 9/1985 | Thielemann et al. |
| 4,796,683 A | 1/1989 | Kawabata et al. |
| 4,915,150 A | 4/1990 | Takusagawa et al. |
| 5,099,899 A | 3/1992 | Takeuchi |
| 5,115,849 A | 5/1992 | Corner |
| 5,154,216 A | 10/1992 | Ochiai et al. |

(Continued)

FOREIGN PATENT DOCUMENTS

| | | |
|---|---|---|
| DE | 3209167 | 9/1983 |
| EP | 0829381 | 3/1998 |

(Continued)

OTHER PUBLICATIONS

Machine translation for Japan 2000-280711 (no date).*

(Continued)

*Primary Examiner* — Steven D Maki
(74) *Attorney, Agent, or Firm* — Shaun J. Fox; Bryan Jaketic (57) ABSTRACT

A tire having an equatorial plane and a circumferential tread is provided. The tread includes at least one recess defined by at least one concave surface having a plurality of sipes formed therein. Optionally, the at least one concave surface can include one or more channel disposed therein.

20 Claims, 5 Drawing Sheets

(56) References Cited

U.S. PATENT DOCUMENTS

| | | | |
|---|---|---|---|
| D335,478 S | 5/1993 | Slingluff et al. | |
| 5,386,861 A | 2/1995 | Overhoff et al. | |
| 5,450,885 A * | 9/1995 | Hanya | 152/209.28 |
| 5,503,206 A | 4/1996 | Consolacion et al. | |
| 5,549,146 A * | 8/1996 | Trabandt et al. | 152/209.19 |
| D390,512 S | 2/1998 | Eromaki | |
| 5,950,700 A | 9/1999 | Fukuoka | |
| 5,957,179 A | 9/1999 | Graas | |
| 6,164,353 A | 12/2000 | Shida et al. | |
| 6,220,321 B1 | 4/2001 | Yoshioka et al. | |
| D446,170 S | 8/2001 | Williams | |
| 6,336,485 B1 | 1/2002 | Kaneko et al. | |
| D454,835 S | 3/2002 | Edwards | |
| D458,586 S | 6/2002 | Demagall et al. | |
| D458,588 S | 6/2002 | Welbes | |
| 6,415,835 B1 | 7/2002 | Heinen | |
| D462,049 S | 8/2002 | Takahashi et al. | |
| D471,149 S | 3/2003 | Endo et al. | |
| D471,858 S | 3/2003 | Endo et al. | |
| 6,527,023 B1 | 3/2003 | Takahashi | |
| 6,530,405 B1 | 3/2003 | Brown et al. | |
| 6,531,012 B2 * | 3/2003 | Ishiyama | 152/209.28 |
| D472,873 S | 4/2003 | Douce | |
| 6,604,564 B1 | 8/2003 | Thiebaud | |
| 6,626,215 B2 | 9/2003 | Ikeda | |
| D482,322 S | 11/2003 | Hiroko | |
| D482,323 S | 11/2003 | Corbin et al. | |
| 6,695,024 B2 | 2/2004 | Neugebauer et al. | |
| D490,363 S | 5/2004 | Miyasaka et al. | |
| D491,129 S | 6/2004 | Maxwell | |
| 6,761,196 B2 | 7/2004 | Takubo | |
| 7,819,153 B2 * | 10/2010 | Byrne et al. | 152/209.18 |
| 2001/0032691 A1 | 10/2001 | Ohsawa | |
| 2008/0121325 A1 * | 5/2008 | Durand | 152/209.18 |

FOREIGN PATENT DOCUMENTS

| | | | |
|---|---|---|---|
| EP | 0952011 | | 10/1999 |
| EP | 1535760 | | 6/2005 |
| FR | 2878190 A1 * | | 5/2006 |
| JP | 56-131406 A * | | 10/1981 |
| JP | 64-009009 | | 1/1989 |
| JP | 64-016406 | | 1/1989 |
| JP | 05-319022 | | 12/1993 |
| JP | 06-099705 A * | | 4/1994 |
| JP | 08-058313 | | 3/1996 |
| JP | 08-058313 A * | | 3/1996 |
| JP | 08-127206 | | 5/1996 |
| JP | 08-318708 | | 12/1996 |
| JP | 08318708 | | 12/1996 |
| JP | 09-136514 | | 5/1997 |
| JP | 63-188505 | | 8/1998 |
| JP | 10-315711 A * | | 12/1998 |
| JP | 11-165509 | | 6/1999 |
| JP | 2000-280711 | | 10/2000 |
| JP | 2000-280711 A * | | 10/2000 |
| JP | 2001-121926 | | 5/2001 |
| JP | 2002-225038 | | 8/2002 |
| JP | 2002-264614 | | 9/2002 |
| JP | 2002264614 | | 9/2002 |
| JP | 2004-098737 | | 4/2004 |
| JP | 2004-098737 A * | | 4/2004 |
| JP | 2008-012969 | | 1/2008 |
| KR | 2004029608 | | 4/2004 |
| WO | WO-95/18022 A1 * | | 12/1994 |
| WO | 95/18022 | | 7/1995 |
| WO | 98/03357 | | 1/1998 |
| WO | 9803357 | | 1/1998 |
| WO | 02068222 | | 9/2002 |

OTHER PUBLICATIONS

Machine translation for Japan 10-315711 (no date).*
Machine translation for Japan 08-058313 (no date).*
Machine translation for Japan 06-099705 (no date).*
Machine translation for Japan 2004-098737 (no date).*
International Preliminary Report on Patentability; International Application No. PCT/US2007/016697; Authorized Officer: Philippe Becamel; Issued May 12, 2009.
Written Opinion of the International Searching Authority; European Patent office; Nov. 27, 2007.
International Search Report; European Patent Office; Nov. 27, 2007.
Office Action; Canadian Patent Application No. 2,668,406; Canadian Intellectual Property Office; Dec. 16, 2013.

* cited by examiner

TIRE INCLUDING CONCAVE RECESSES IN A CIRCUMFERENTIAL TREAD

CROSS REFERENCE TO RELATED APPLICATIONS

This application is a continuation of U.S. patent application Ser. No. 11/594,383, filed on Nov. 8, 2006, the disclosure of which is incorporated by reference herein in its entirety.

FIELD OF INVENTION

The present application relates to a tire that includes one or more concave recesses in a tread of the tire. More particularly, the present application relates to a tire that includes one or more concave recesses defined by at least one concave surface having sipes and/or a channel formed therein.

BACKGROUND

Many motor vehicle tires have a circumferential tread provided with a plurality of spaced-apart circumferential grooves that define ribs therebetween. Typically, generally lateral slots can be provided in the ribs to form a plurality of shaped blocks. These shaped blocks can be distributed along the tread according to a specific pattern. Sipes, which are generally narrow slits cut into the tread, can be provided in the shaped blocks in a specific pattern.

Within the tread pattern in which the circumferential grooves are provided, the shaped blocks are typically distributed in several side-by-side rows. A proper distribution of the shaped blocks gives the tire the desired characteristics of directional control stability and road gripping in relation to the sidewise thrusts directed parallel to the wheel axis. The lateral slots, in turn, give the tire the desired traction (i.e., the capability of efficiently transmitting tangential thrusts parallel to the running direction during speeding up and slowing down of the vehicle). In principle, the traction of the tire on snow laden surfaces tends to become greater as the number of the lateral slots arranged in the tread increases and the orientation of the slots themselves approach an orientation that is perpendicular to the running direction of the tire.

Also, sipes provided in a rib or shaped block of a tire can improve snow traction of the tire. For example, as the tire rolls, the sipes present multiple "edges" to the snow-laden surface. These edges can act as fingers to grip the snow, thereby improving traction of the tire in snow. Thus, the more sipes provided in a rib or shaped block, the greater the circumferential edge density of the tire, which results in improved snow traction of the tire.

SUMMARY

In one embodiment, a circumferential tread of a tire is provided. The tread comprises a plurality of concave recesses. The plurality of concave recesses includes first and second concave recesses, each of which is defined by a concave surface, has a longitudinal axis oriented at an acute angle relative to the equatorial plane of the tire, and includes a channel disposed in the concave surface. The longitudinal axis of the channel is oriented at an acute angle relative to the longitudinal axes of the first and second concave recesses.

In another embodiment, a tire is provided. The tire has an equatorial plane and includes a circumferential tread. The tread includes at least one recess defined by at least one concave surface having a plurality of sipes formed therein. In another embodiment, a tire is provided with a circumferential tread having a plurality of shoulder blocks circumferentially-spaced about the tire, wherein an outer edge of one or more shoulder blocks is at least partially defined by a concave surface that includes a plurality of sipes disposed therein.

In another embodiment, a vulcanization mold for producing a tire is provided. The mold includes a mold housing having tread imparting structure configured to form a tread in a green tire. The tread imparting structure includes at least one recess-forming element configured to form at least one concave recess in the tread of the tire. The at least one recess-forming element has a longitudinal axis, at least one convex surface, and a plurality of sipe-forming elements configured to form a plurality of sipes in the tread of the tire. One or more of the sipe-forming elements are oriented substantially parallel to the longitudinal axis of the at least one recess-forming element.

BRIEF DESCRIPTION OF DRAWINGS

In the accompanying drawings, tires, tread patterns, and molds are illustrated that, together with the detailed description provided below, describe exemplary embodiments of the claimed invention. In the drawings and description that follows, like elements are identified with the same reference numerals. The drawings are not to scale and the proportion of certain elements may be exaggerated for the purpose of illustration. The illustrated boundaries of the elements in the drawings represent one example of the boundaries.

DETAILED DESCRIPTION

The following includes definitions of selected terms employed herein. The definitions include various examples and/or forms of components that fall within the scope of a term and that may be used for implementation. The examples are not intended to be limiting. Both singular and plural forms of terms may be within the definitions.

"Axial" or "axially" refer to a direction that is parallel to the axis of rotation of a tire.

"Circumferential" and "circumferentially" refer to lines or directions extending along the perimeter of the surface of the tread parallel to the equatorial plane and perpendicular to the axial direction of the tire.

"Equatorial plane" refers to the plane that is perpendicular to the tire's axis of rotation and passes through the center of the tire's tread.

"Groove" refers to an elongated void area in the tread of the tire that extends circumferentially in a straight, curved, wavy, zig-zag, or any other non-straight manner.

"Lateral" or "laterally" refer to a direction along the tread of the tire going from one sidewall of the tire to the other sidewall.

"Radial" or "radially" refer to a direction that is perpendicular to the axis of rotation of the tire.

"Rib" or "ribs" define the circumferential extending strip or strips of rubber on the tread that is bounded by one circumferential groove and either a second groove or a lateral edge of the tread.

"Sipe" refers to a thin slit formed in the surface of the tread that may extend laterally, circumferentially, or at an acute angle with respect to the circumferential direction of the tire. The sipe can be straight, curved, zig-zag, wavy, or take the form of any other non-straight configuration.

"Slot" refers to an elongated void in the tread of the tire that extends laterally or at an acute angle relative to the circumferential direction of the tire. The slot can be straight, curved, zig-zag, wavy, or take the form of any other non-straight configuration.

"Tread" refers to that portion of the tire that comes into contact with the road under normal loading.

Directions are also stated in this application with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" are used in connection with an element, the "upper" element is spaced closer to the tread than the "lower" element. Additionally, when relative directional terms such as "above" or "below" are used in connection with an element, an element that is "above" another element is closer to the tread than the other element. The terms "inward" and "inwardly" refer to a general direction towards the equatorial plane of the tire, whereas "outward" and "outwardly" refer to a general direction away from the equatorial plane of the tire and towards the sidewall of the tire. Thus, when relative directional terms such as "inner" and "outer" are used in connection with an element, the "inner" element is spaced closer to the equatorial plane of the tire than the "outer" element.

Figure 1:
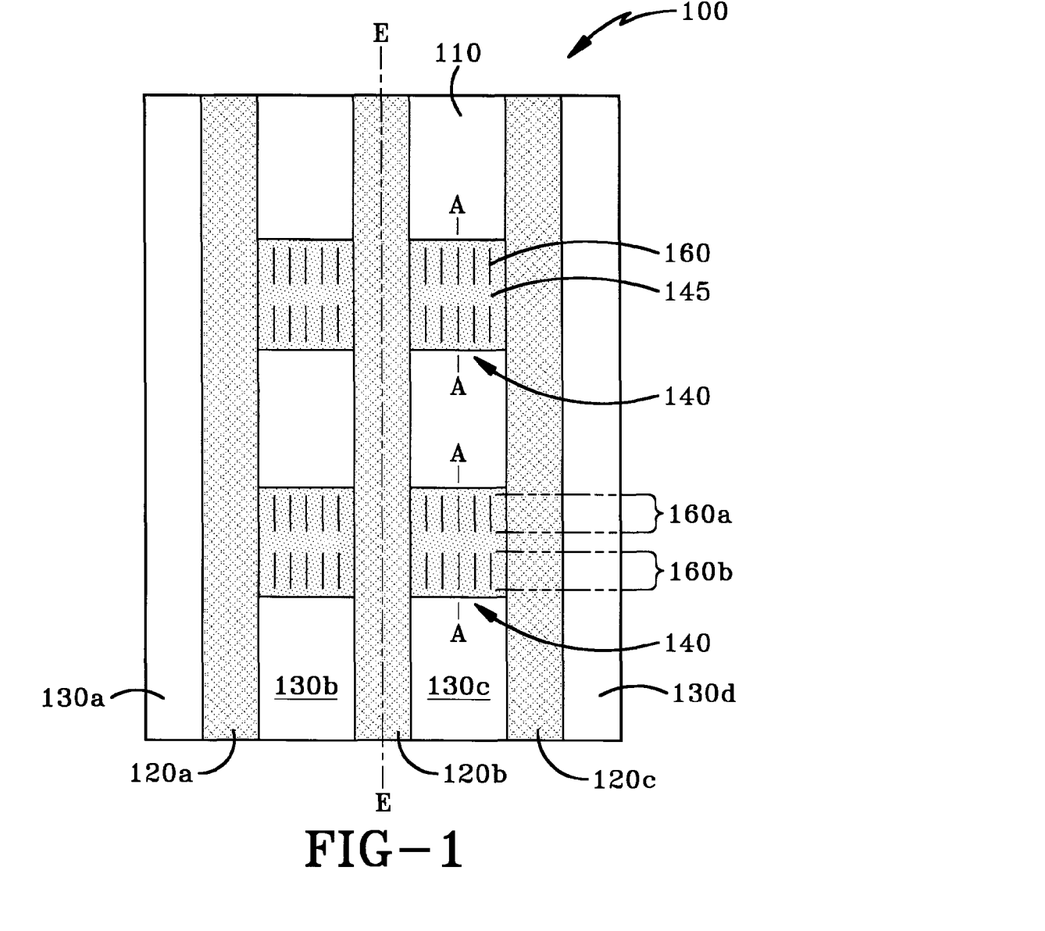
FIG. 1 is a plan view of one embodiment of a tire 100 including concave recesses provided in ribs of a tread of the tire.

Illustrated in FIG. 1 is a plan view of one embodiment of a tire 100. The tire 100 includes a tread 110 extending circumferentially around the tire 100. As shown in FIG. 1, the tread 110 is defined by three grooves 120a-c that extend circumferentially around the tire 100. These three grooves 120a-c divide the tread 110 into four axially spaced-apart ribs 130a-d. The ribs 130 define the road engaging portion of the tire 100 and define an approximate width of the tread 110. In alternative embodiments (not shown), depending on the tread design, the tread 110 of the tire 100 can be configured with n number of circumferential grooves and n+1 number of circumferential ribs, where n is equal to an integer of 1 or more.

With continued reference to FIG. 1, the tread 110 is provided with a plurality of concave recesses 140 disposed in ribs 130b,c. Although FIG. 1 illustrates four total concave recesses 140, the tread 110 can include any number of concave recesses in other embodiments. Additionally, although FIG. 1 shows a plurality of concave recesses 140 provided in ribs 130b,c, the concave recesses may be provided in one rib, any combination of ribs, or all ribs.

In the illustrated embodiment, each concave recess 140 has a longitudinal axis A that is oriented substantially parallel to an equatorial plane E of the tire 100 and substantially parallel to each other. In alternative embodiments (not shown), the longitudinal axis A of one or more of the concave recesses 140 may be oriented substantially perpendicular to or at an acute angle relative to the equatorial plane E of the tire 100. Additionally, the longitudinal axis A of one or more concave recesses 140 may be oriented substantially perpendicular to or at an acute angle relative to the longitudinal axes of other concave recesses disposed in the tread 110.

As shown in FIG. 1, the concave recesses 140, when viewed from the top, are rectangular in shape. In alternative embodiments (not shown), one or more of the concave recesses 140 may take the form of any shape when viewed from the top, including without limitation a circle, semi-circle, ellipse, square, parallelogram, trapezoid, or any other polygon.

Figure 2:
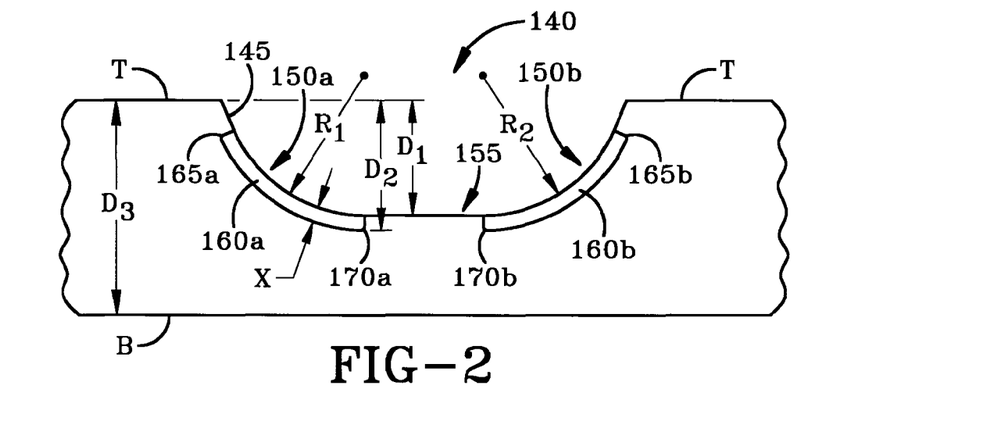
FIG. 2 is a partial cross-sectional view taken along longitudinal axis A in FIG. 1.

FIG. 2 illustrates an enlarged cross-section, taken along the longitudinal axis A, of the concave recess 140 provided in the rib 130c of the tire 100. The concave recess 140 is defined by structure provided in the rib 130c of the tread 110 of the tire 100 (hereinafter referred to as "recess-defining structure") that includes a concave surface 145.

In the illustrated embodiment, the concave surface 145 has first and second side portions 150a,b and a bottom portion 155 provided between the side portions 150a,b of the concave surface 145. The side portions 150a,b of the concave surface 145 are defined by radii $R_1$, $R_2$, respectively. In the illustrated embodiment, $R_1$ is equal to $R_2$. However, in alternative embodiments (not shown), $R_1$ and $R_2$ may have different values. In other embodiments (not shown), one or both of the side portions 150a,b of the concave surface may be parabolic-shaped or may be defined by an irregular curve.

In other embodiments (not shown), the concave surface 145 may be defined by a combination of several tangent radii. For example, the concave surface 145 may be defined by two or more radii with tangents (viewed in cross section) that work together to form a continuous surface. In another embodiment (not shown), the cross-section of the recess-defining structure may define a concave surface that is a portion of a circle (which is defined by a single radius). For example, the cross-section of the recess-defining structure may be a semi-circle, thereby giving the concave recess a "half-pipe" shape.

Each concave recess 140 has a depth $D_1$ measured from an outer surface of the tread 110 of the tire 100 (hereinafter "the outer tread surface T") to the bottom surface 155. In one embodiment, the depth $D_1$ of the concave recess 140 is less than the full depth $D_2$ of one of the grooves 120 (e.g., groove 120b) measured from the outer tread surface T to the base B of the groove 120b. Preferably, the depth $D_1$ of each concave recess 140 is about 80% of the full depth $D_2$ of the groove 120b. In other embodiments (not shown), the depth $D_1$ of one or more of the concave recesses 140 can be between about 50% and about 90% of the full depth $D_2$ of the groove 120b.

With reference to FIGS. 1 and 2, the concave surface 145 includes a plurality of sipes 160 disposed therein. In the illustrated embodiment, the sipes 160 include a first set of sipes 160a and a second set of sipes 160b. The first set of sipes 160a includes first ends 165a that begin in the first side portion 150a of the concave surface 145 and second ends 170a that terminate in the bottom portion 160 of the concave surface 145. The second set of sipes 160b includes first ends 165b that begin in the first side portion 150b of the concave surface 145 and second ends 170b that terminate in the bottom portion 160 of the concave surface 145 and are spaced from the second ends 170a of the first set of sipes 160a. In alternative embodiments (not shown), the concave surface 145 can include one or more continuous sipes that extend from the first side portion 150a to the second side portion 150b. Additionally, in other embodiments (not shown), the concave surface 145 can include one or more sipes disposed in the first side portion 150a, in the second side portion 150b, in the bottom portion 155, or combination thereof. Simply put, the sipes disposed in the concave surface 145 can extend along the entire length of the concave surface 145 or any portion thereof.

With reference back to FIG. 1, the sipes 160 are oriented substantially parallel to the longitudinal axis A of the concave recess 140. In alternative embodiments (not shown), one or more of the sipes 160 (if they are rectilinear as shown in FIG. 1) may be oriented at an acute angle with respect to or substantially perpendicular to the longitudinal axis A of the concave recess 140. In another embodiment (not shown), one or more of the concave surfaces 145 may not include any sipes 160.

Each sipe 160 has a depth X measured from the concave surface 145 of the concave recess 140 to the bottom of the sipe 160. In one embodiment, the depth X of one or more of the sipes 160 is about 0.030 inches. In other embodiments, the depth X of one or more of the sipes 160 can be between about 0.010 inches and about 0.050 inches. In other embodiments, one or more sipes 160 can be deeper depending on the design.

Figure 3:
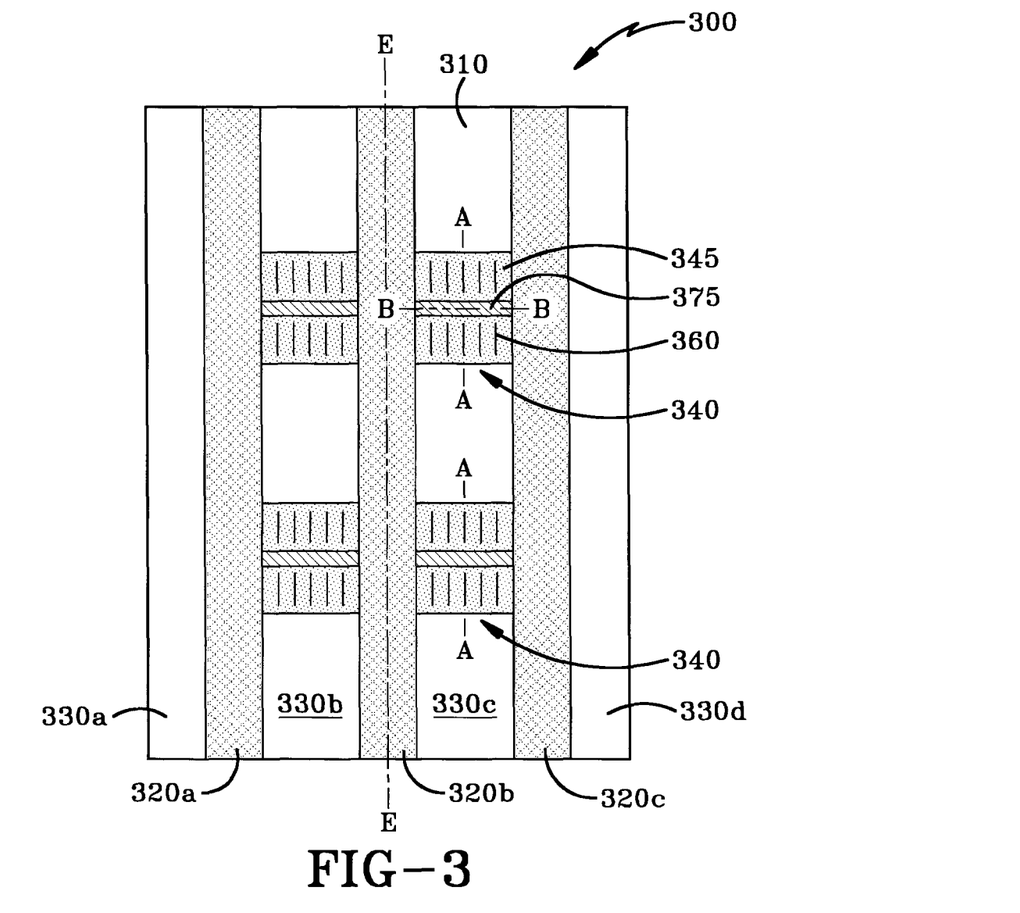
FIG. 3 is a plan view of another embodiment of a tire 300 including concave recesses provided in ribs of a tread of the tire.

Illustrated in FIG. 3 is a plan view of another embodiment of a tire 300. The tire 300 includes a tread 310 extending circumferentially around the tire 300. As shown in FIG. 3, the tread 310 is defined by three grooves 320a-c that extend circumferentially around the tire 300. These three grooves 320a-c divide the tread 310 into four axially spaced-apart ribs 330a-d. The ribs 330 define the road-engaging portion of the tire 300 and define an approximate width of the tread 310. In alternative embodiments (not shown), depending on the tread design, the tread 310 of the tire 300 can be configured with n number of circumferential grooves and n+1 number of circumferential ribs, where n is equal to an integer of 1 or more.

With continued reference to FIG. 3, the tread 310 is provided with a plurality of concave recesses 340 disposed in ribs 330b,c. Although FIG. 3 illustrates four total concave recesses 340, the tread 310 can include any number of concave recesses in other embodiments. Additionally, although FIG. 3 shows a plurality of concave recesses 340 provided in ribs 130b,c, the concave recesses may be provided in one rib, any combination of ribs, or all ribs.

Figure 4:
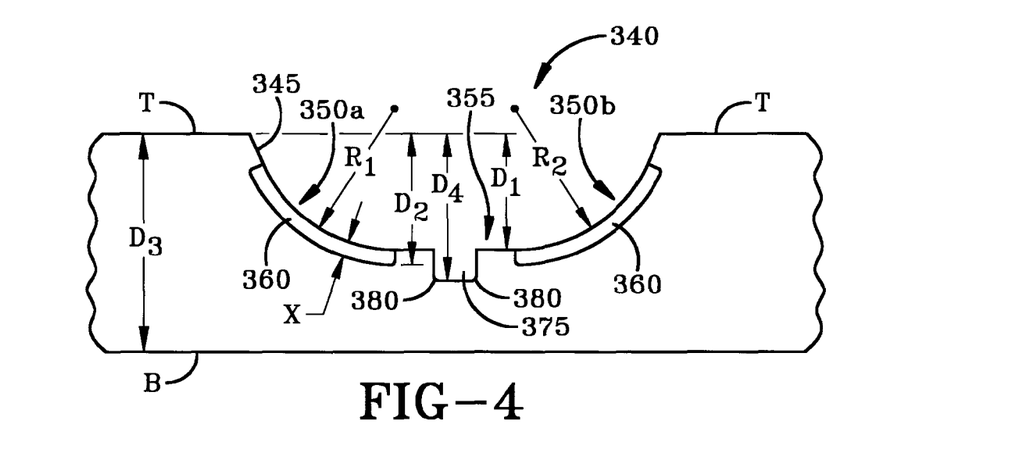
FIG. 4 is a partial cross-sectional view taken along longitudinal axis A in FIG. 3.

FIG. 4 illustrates an enlarged cross-section, taken along the longitudinal axis A, of the concave recess 340 provided in the rib 330c of the tire 300. The concave recess 340 is defined by structure provided in the rib 330c of the tread 310 of the tire 300 (hereinafter referred to as "recess-defining structure") that includes a concave surface 345. In the illustrated embodiment, the concave surface 345 has first and second side portions 350a,b and a bottom portion 355 provided between the side portions 350a,b of the concave surface 345.

In the illustrated embodiment, each concave recess 340 has a longitudinal axis A that is oriented substantially parallel to an equatorial plane E of the tire 300 and substantially parallel to each other. In alternative embodiments (not shown), the longitudinal axis A of one or more of the concave recesses 340 may be oriented substantially perpendicular to or at an acute angle relative to the equatorial plane E of the tire 300. Additionally, the longitudinal axis A of one or more concave recesses 340 may be oriented substantially perpendicular to or at an acute angle relative to the longitudinal axes of other concave recesses disposed in the tread 310.

Each concave recess 340 has a depth $D_1$ measured from an outer surface of the tread 310 of the tire 300 (hereinafter "the outer tread surface T") to the bottom surface 355. In one embodiment, the depth $D_1$ of the concave recess 340 is less than the full depth $D_2$ of one of the grooves 320 (e.g., groove 320b) measured from the outer tread surface T to the base B of the groove 320b. Preferably, the depth $D_1$ of each concave recess 340 is about 80% of the full depth $D_2$ of the groove 320b. In other embodiments (not shown), the depth $D_1$ of one or more of the concave recesses 340 can be between about 50% and about 90% of the full depth $D_2$ of the groove 320b.

Each concave recess 340 has a cross-section, taken along the longitudinal axis A, that is substantially similar to the cross-section of the concave recess 140 described above and illustrated in FIG. 2, except that it is provided with a channel 375 in a bottom portion 355 of the concave surface 345. Accordingly, the concave recess 340 in this embodiment has substantially the same shape and characteristics as the concave recesses 140 described above and illustrated in FIG. 2.

With reference to FIG. 3, the channel 375 has a longitudinal axis B that is oriented substantially perpendicular to the longitudinal axis A of the concave recess 340. In alternative embodiments, the longitudinal axis B of the channel 375 may be oriented substantially parallel to or at an acute angle with respect to the longitudinal axis A of the concave recess 340. Alternatively, two or more channels may be provided in the concave surface 345.

The channel 375 is defined by structure provided in the rib 330c of the tread 310 of the tire 300 (hereinafter referred to as "channel-defining structure"). As shown in FIG. 4, the channel-defining structure is substantially U-shaped, thereby forming the channel 375 having a cross-section that is substantially rectangular-shaped having two rounded corners 380. In alternative embodiments (not shown), the cross-section of the channel 375 can take the form of various shapes, including without limitation semi-circular, parabolic, curved, square, trapezoid, or any other polygon. Moreover, the cross-section of the channel 375 may be uniform (as shown) or non-uniform.

Each channel 375 has a depth $D_3$ measured from an outer tread surface T to the bottom of the channel 375. In one embodiment, the depth $D_3$ of the concave recess 340 is about 100% of the full depth $D_2$ of one of the grooves 320 (e.g., groove 320b) measured from the outer tread surface T to the base B of the groove 320b. In other embodiments (not shown), the depth $D_3$ of one or more of the channels 375 can be between about 70% and about 100% of the full depth $D_2$ of the groove 320b.

In the illustrated embodiment, the concave surface 345 also includes a plurality of sipes 360 disposed therein that are substantially similar to the sipes 360 discussed above and illustrated in FIGS. 1 and 2. Each sipe 360 has a depth X measured from the concave surface 345 of the concave recess 340 to the bottom of the sipe 360. In one embodiment, the depth X of one or more of the sipes 360 is about 0.030 inches. In other embodiments, the depth X of one or more of the sipes 360 can be between about 0.010 inches and about 0.050 inches. In other embodiments, one or more sipes 360 can be deeper depending on the design.

Figure 5:
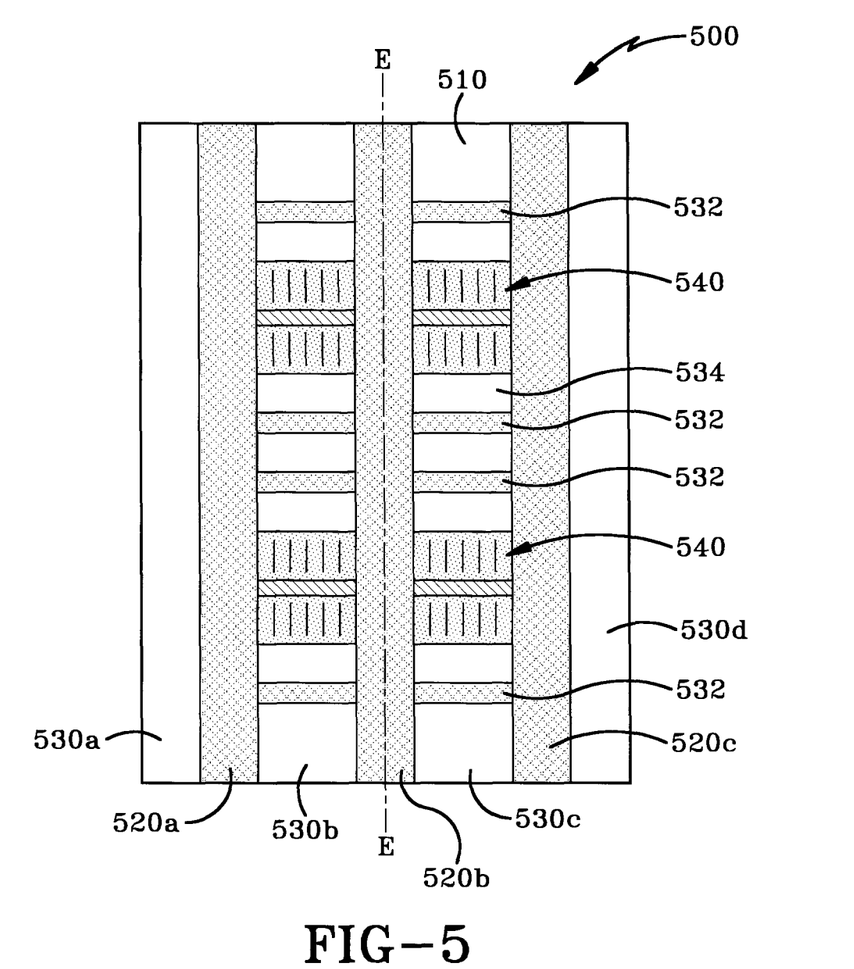
FIG. 5 is a plan view of another embodiment of a tire 500 including recesses provided in blocks of a tread of the tire.

FIG. 5 is a front elevation view of another embodiment of a tire 500 configured with a plurality of concave recesses disposed in a tread of the tire 500. The tire 500 includes a tread 510 extending circumferentially around the tire 500. The tread 510 is defined by three grooves 520a-c that extend circumferentially around the tire 500, thereby dividing the tread 510 into axially spaced-apart ribs 530a-d. The ribs 530 define the road engaging portion of the tire 500 and define an approximate tread width. In alternative embodiments (not shown), the tread 510 of the tire 500 can include n number of circumferential grooves and n+1 number of circumferential ribs, where n is equal to 1 or more.

In this embodiment, the tread 510 is further defined by substantially rectilinear slots 532 that divide the ribs 530 into circumferentially spaced-apart blocks 534. As shown in FIG.

3, the slots 532 are oriented substantially perpendicular to the equatorial plane E of the tire 500. In alternative embodiments (not shown), one or more of the slots 532 may be oriented substantially parallel to or at an acute angle with respect to equatorial plane E of the tire 500. Alternatively, one or more of the slots 532 may be curved, wavy, or zigzag-shaped to form various shaped blocks.

With continued reference to FIG. 5, the tread 510 is provided with a plurality of concave recesses 540 disposed in the blocks 534. The concave recesses 540 in this embodiment have substantially the same shape, orientation, and characteristics (including a channel and sipes) as the concave recess 340 described above and illustrated in FIGS. 3 and 4. Although FIG. 5 shows a concave recess 540 disposed in each block 534, one or more blocks 534 may be provided without concave recesses 540.

Figure 6:
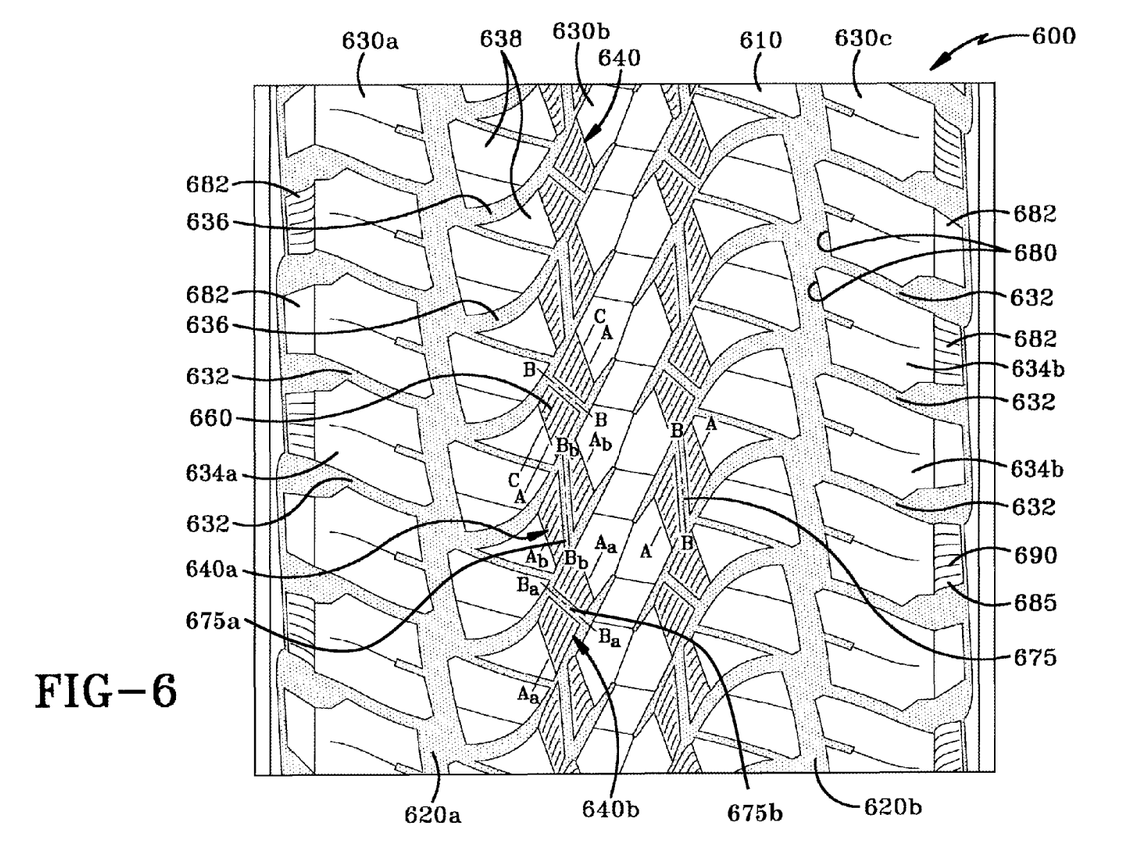
FIG. 6 is an enlarged plan view of another embodiment of a tire 600 including concave recesses provided in a tread of the tire.
Figure 7:
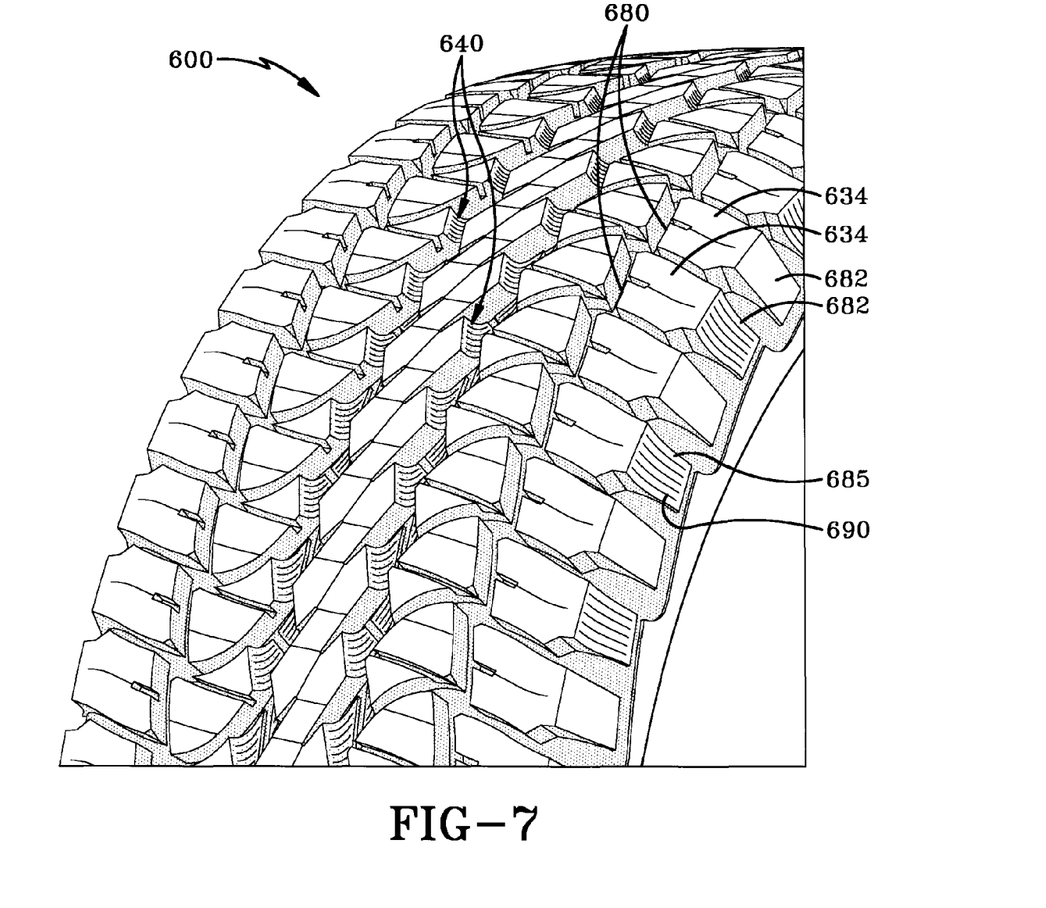
FIG. 7 is a fragmentary perspective view of the tire 600 of FIG. 6.

FIGS. 6 and 7 illustrate an enlarged plan view and a fragmentary perspective view, respectively, of a portion of a tire 600 configured with a plurality of concave recesses disposed in a tread of the tire 600. The tire 600 includes a tread 610 extending circumferentially around the tire 600. The tread 610 is defined by two grooves 620a,b that extend circumferentially around the tire 600, thereby dividing the tread 610 into three axially spaced-apart ribs 630. The ribs 630 include a central rib 630b centered with respect to an equatorial plane E of the tire 100 and outer ribs 630a,c (which also be referred to as shoulder ribs 630a,c). The ribs 630a-c define the road-engaging portion of the tire 600 and define an approximate tread width. In alternative embodiments (not shown), the tread 610 of the tire 600 can include n number of circumferential grooves and n+1 number of circumferential ribs, where n is equal to 1 or more.

With further reference to FIGS. 6 and 7, the tread 610 is further defined by slots 632 that divide the shoulder ribs 630a,c into circumferentially spaced-apart shoulder blocks 634a,b, respectively. The slots 632 may be straight, curved, wavy, or zigzag-shaped to form various shaped blocks. The tread 610 is also defined by slots 636 that form segmented tread portions 638 in the central rib 630b.

In the illustrated embodiment, a plurality of concave recesses 640 are disposed in or between the segmented tread portions 638. Each concave recess 640 has a longitudinal axis A that is oriented at an acute angle relative to an equatorial plane E of the tire 600. Additionally, the longitudinal axis A of each concave recess 640 is oriented at an acute angle of substantially parallel relative to each other as shown in FIG. 6. In alternative embodiments (not shown), the longitudinal axis A of one or more of the concave recesses 640 may be oriented substantially perpendicular to or substantially parallel with the equatorial plane E of the tire 600. Additionally, the longitudinal axis A of one or more concave recesses 640 may be oriented substantially perpendicular to the longitudinal axes of other concave recesses disposed in the tread 610.

As shown in FIG. 6, the concave recesses 640, when viewed from the top, take the shape of a parallelogram. In alternative embodiments (not shown), one or more of the concave recesses 640 may take the form of any shape when viewed from the top, including without limitation a circle, semi-circle, ellipse, square, rectangle, trapezoid, or any other polygon.

The concave recesses 640 are defined by structure provided in the segmented tread portions 638 of the tread 610 of the tire 600. Each concave recess 640 has a cross-section, taken along the longitudinal axis A, that is substantially similar to the cross-section of the concave recess 140 described above and illustrated in FIG. 2. Accordingly, the concave recess 640 in this embodiment has substantially the same shape and characteristics as the concave recesses 140 described above and illustrated in FIG. 2.

With continued reference to FIG. 6, a channel 675 is disposed in a bottom surface of the structure that defines the concave recess 640. In the illustrated embodiment, the cross-section of the channel 675 is substantially similar to the cross-section of the channel 375 described above in relation to FIG. 4. Accordingly, the channel 675 in this embodiment has substantially the same shape and characteristics as the channel 375 described above and illustrated in FIG. 4.

As shown in FIG. 7, the channel 675 has a longitudinal axis B that is oriented at an acute angle relative to the longitudinal axis A of the concave recess 640. In alternative embodiments (not shown), the longitudinal axis B of the channel 675 may be oriented substantially parallel or substantially perpendicular to the longitudinal axis A of the concave recess 640.

With continued reference to FIG. 6, the recess-defining structure includes a plurality of sipes 660 disposed therein. The sipes 660 are substantially similar to the sipes 160 discussed above and illustrated in FIGS. 1 and 2. The sipes 660 have a longitudinal axis C that is oriented substantially parallel to the longitudinal axis A of the concave recess 640. In alternative embodiments (not shown), one or more of the sipes 660 may be oriented substantially perpendicular to or at an acute angle relative to the longitudinal axis A of the concave recess 640.

In the illustrated embodiment, the concave recesses 640 are arranged in a series circumferentially about the tread 610 of the tire 600. This series of recesses 640 includes first and second adjacent concave recesses 640a,b. The first and second concave recesses 640a,b include channels 675a,b respectively. As shown in FIG. 6, the longitudinal axis $B_a$ of the channel 675a of the first recess 640a is oriented at an acute angle relative to the longitudinal axis $B_b$ of the channel 675b of the second recess 640b. In this fashion, the longitudinal axes B of the channels 675 are arranged in an alternating pattern about the circumference of the tread 610 of the tire 600.

As shown in FIG. 6, the tread 610 has a series of segmented tread portions 638 disposed circumferentially about the tire 600, with each block in this series having two concave recesses 640 disposed therein. In alternative embodiments (not shown), the blocks may have any number of concave recesses disposed therein.

With continued reference to FIGS. 6 and 7, each shoulder block 634a,c includes an inner edge 680 and an outer edge 682. In the illustrated embodiment, the outer edges 682 (or a portion thereof) of some of the shoulder blocks 634 have a concave surface 685. The concave surface 685 can be defined by one or more radii, a parabola, or an irregular curved surface similar to the curved surface 145 described above and illustrated in FIG. 2. Although FIG. 6 illustrates both rows of shoulder blocks 634a,c having concave surfaces 685, only one row of shoulder blocks may be provided with concave surfaces 685 in another embodiment not shown.

The concave surface 685 includes a plurality of sipes 690 disposed therein. As shown in FIGS. 6 and 7, the sipes 690 are circumferentially spaced apart and extend along a portion of the concave surface 685. In other embodiments (not shown), one or more of the sipes 690 can extend along the entire length of the concave surface 685.

In the illustrated embodiment, the sipes 690 are oriented substantially perpendicular to the equatorial plane E of the tire 600. In alternative embodiments (not shown), one or more of the sipes 690 may be oriented at an acute angle with respect to or substantially perpendicular to the equatorial plane E of the tire 600. In another embodiment (not shown), the concave surface 685 may not include any sipes 690.

As shown in FIG. 7, concave surfaces 685 with sipes 690 are provided on the outer edges 682*a,c* of alternating shoulder blocks 634*a,c*. In this fashion, the shoulder blocks that do not have a concave surface at their outer edges help to protect the sipes 690 in the concave surfaces 685 of the shoulder blocks 634*a,c*, since the shoulder blocks not having concave surfaces at their outer edges extend further outward. In other embodiments (not shown), concave surfaces 685 with sipes 690 can be provided on the outer edges 682*a,c* of shoulder blocks 634*a,c* according to any pattern (e.g., every third shoulder block, every fourth shoulder block, or a random pattern).

By providing the concave recesses described above in the tread of the tire, vehicle handling on snow-laden surfaces can be improved. For example, the sipes provided in the concave recesses can capture the snow therein so that snow can be accumulated in the concave recess. Expressed differently, the sipes permit the snow to be wedged therein so that snow can be accumulated in the concave recess. This accumulation of snow in the concave recess promotes snow-to-snow traction as the tire rolls along a snow-laden surface, thereby improving tire traction on the snow-laden surface. Additionally, because the sipes in the concave recesses are relatively shallow, the chip/tear characteristics of the tire tread blocks can be improved.

The treads of the tires discussed above are not limited to the embodiments discussed above and illustrated in the figures. The tread of the tire may be configured in any desired tread design or pattern without departing from the scope of this application. For example, one or more grooves and/or one or more ribs can have a substantially constant or uniform cross-section around the circumference of the tire. Alternatively, one or more grooves and/or one or more ribs can have a variable cross-section that extends around the circumference of the tire. Additionally, both edge portions of the grooves and/or both edge portions of the ribs can be symmetrical or asymmetrical. Furthermore, the ribs may include any combination of sipes, slots, etc. to form a wide variety of desired tread patterns.

The tires described above and illustrated in FIGS. 1-7 can be produced in a variety of ways. One exemplary production method includes the use of a tire vulcanization mold. The mold includes tread-imparting structure configured to form a tread onto a green tire being molded. The tread imparting structure can include one or more circumferential frame segments that protrude outward from a base surface. The circumferential frame segments can be arranged at certain intervals in the lateral direction of the tire.

To impart the concave recesses described above into the tread of the tire the tread imparting structure can include one or more recess-forming elements. The shape and dimensions of the recess-forming elements directly correspond to the shape and dimensions of the concave recess described above. For example, the recess-forming element can include a convex portion, a channel-forming portion, and a plurality of sipe-forming portions.

The recess-forming elements can be provided in the mold in a variety of ways. For example, the recess-forming element can be formed as a separate component that can be inserted into the mold and secured thereto via pins. Other means to secure the recess-forming element to the mold are possible and known in the art. Alternatively, the recess-forming element can be an integral part of the mold (e.g., formed directly in the mold during casting of the mold).

To produce the tire in the mold, a green tire is first placed in the mold. To support the green tire during the molding process, a high temperature and high pressure medium is charged into a bladder (not shown). As the mold is collapsed around the green tire, the tread imparting structure is forced into the green tire. In this manner, the circumferential frame segments form one or more circumferential grooves in the outer surface of the tread of the tire. In this same manner, the recess-forming elements are forced into the green tire, thereby forming concave recesses in the outer surface of the tread of the tire.

While the present application illustrates various embodiments, and while these embodiments have been described in some detail, it is not the intention of the applicant to restrict or in any way limit the scope of the claimed invention to such detail. Additional advantages and modifications will readily appear to those skilled in the art. Therefore, the application, in its broader aspects, is not limited to the specific details, the representative apparatus, and illustrative examples shown and described. Accordingly, departures may be made from such details without departing from the spirit or scope of the applicant's claimed invention.

The invention claimed is:

1. A tire having an equatorial plane, the tire comprising:
a circumferential tread having an outer tread surface;
a plurality of grooves disposed in the circumferential tread, including at least a first groove and a second groove;
at least one recess disposed in the circumferential tread extending from the first groove to the second groove, the at least one recess defined by a bottom surface, a first curved side surface extending in a concave manner from the bottom surface to the outer tread surface, and a second curved surface extending in a concave manner from the bottom surface to the outer tread surface, each of the first curved side surface and the second curved side surface having at least one sipe formed therein, wherein the at least one sipe does not extend into any of the outer tread surface of the circumferential tread and the bottom surface of the at least one recess; and
a channel disposed in the bottom surface of the at least one recess, the channel extending from the first groove to the second groove without extending into either of the first curved side surface and the second curved side surface, wherein the channel is defined by a bottom surface and at least two substantially straight sidewalls disposed in a substantially radial direction.

2. The tire of claim 1, wherein the at least one recess has a longitudinal axis that is oriented at an acute angle relative to the equatorial plane of the tire.

3. The tire of claim 1, wherein the at least one recess has a longitudinal axis that is oriented substantially parallel to the equatorial plane of the tire.

4. The tire of claim 1, wherein the at least one sipe is oriented substantially perpendicular to the equatorial plane of the tire.

5. The tire of claim 1, wherein the at least one sipe is oriented at an acute angle relative to the equatorial plane of the tire.

6. The tire of claim 1, wherein the channel has a longitudinal axis that is oriented substantially parallel to the equatorial plane of the tire.

7. The tire of claim 1, wherein the channel has a longitudinal axis that is oriented at an acute angle relative to both the equatorial plane of the tire and a longitudinal axis of the at least one recess.

8. The tire of claim 1, wherein the at least one recess has a rectangular shape when viewed from above.

9. The tire of claim 1, wherein the circumferential tread has a plurality of shoulder blocks each having an outer edge, one or more of the outer edges of each of the plurality shoulder blocks being at least partially defined by a concave curved surface that includes a plurality of sipes disposed therein.

10. The tire of claim 1, wherein the bottom surface of the at least one recess is substantially flat.

11. A circumferential tread of a tire having an equatorial plane, the circumferential tread comprising:
a plurality of concave recesses, including a first concave recess that extends from a first slot to a second slot, and a second concave recess that extends from the second slot to a third slot,
wherein each of the plurality of concave recesses is defined by at least two concave curved side surfaces and a substantially flat bottom surface, and
wherein each of the plurality of concave recesses has a longitudinal axis oriented at an acute angle relative to the equatorial plane of the tire;
a first channel disposed in the substantially flat bottom surface of the first concave recess extending from the first slot to the second slot without extending into a concave curved side surface, wherein the first channel is defined by a bottom surface and at least two substantially straight sidewalls disposed substantially perpendicular to the substantially flat bottom surface of the first concave recess; and
a second channel disposed in the substantially flat bottom surface of the second concave recess extending from the second slot to the third slot without extending into a concave curved side surface, wherein the second channel is defined by a bottom surface and at least two substantially straight sidewalls disposed substantially perpendicular to the substantially flat bottom surface of the second concave recess.

12. The circumferential tread of claim 11, wherein the channel in the first concave recess has a longitudinal axis oriented at an acute angle relative to the longitudinal axis of the first concave recess and the channel in the second concave recess has a longitudinal axis oriented at an acute angle relative to the longitudinal axis of the second concave recess.

13. The circumferential tread of claim 12, wherein the longitudinal axis of the channel disposed in the substantially flat bottom surface of the first concave recess is oriented at an acute angle relative to the longitudinal axis of the channel disposed in the substantially flat bottom surface of the second concave recess.

14. The circumferential tread of claim 11, wherein the longitudinal axis of the first concave recess is oriented at an acute angle relative to the longitudinal axis of the second concave recess.

15. The circumferential tread of claim 11, wherein the plurality of concave recesses are arranged in a series circumferentially about the tire in an alternating pattern, such that a longitudinal axis of the channel disposed in the substantially flat bottom surface of one concave recess is:
oriented at an acute angle relative to a longitudinal axis of the channel disposed in the substantially flat bottom surface of an adjacent concave recess; and
oriented substantially parallel to a longitudinal axis of the channel disposed in the substantially flat bottom surface of another concave recess.

16. The circumferential tread of claim 11, wherein each of the at least two concave curved side surfaces of each of the plurality of concave recesses includes a plurality of sipes.

17. The circumferential tread of claim 11, wherein each of the plurality of concave recesses has a parallelogram shape when viewed from above.

18. A tire comprising:
a plurality of first recesses, each of the plurality of first recesses having a longitudinal axis, at least two side surfaces, a substantially flat bottom surface extending from the at least two side surfaces, and a channel disposed in the substantially flat bottom surface without extending into either of the at least two side surfaces; and
a plurality of second recesses, each of the plurality of second recesses having a longitudinal axis, at least two side surfaces, a substantially flat bottom surface extending from the at least two side surfaces, and a channel disposed in the substantially flat bottom surface without extending into either of the at least two side surfaces,
wherein the plurality of first and second recesses are arranged in a series circumferentially about the tire in an alternating pattern,
wherein the channel in each of the plurality of first recesses has a longitudinal axis oriented at an acute angle relative to the longitudinal axis of the first recess and the channel in each of the plurality of second recesses has a longitudinal axis oriented at an acute angle relative to the longitudinal axis of the second recess, and
wherein the longitudinal axis of each channel is oriented at an acute angle relative to the longitudinal axis of the channel disposed in the substantially flat bottom surface of each adjacent recess.

19. The tire of claim 18, wherein each of the at least two side surfaces of each of the plurality of first and second recesses includes a plurality of sipes.

20. The tire of claim 18, wherein each of the plurality of first recesses is adjacent one of the plurality of second recesses.

* * * * *